United States Patent [19]

Saunders

[11] 4,117,700
[45] Oct. 3, 1978

[54] LOCKING ARRANGEMENT FOR RADIOS OR THE LIKE

[76] Inventor: Charlie H. Saunders, 167 Highland St., Valparaiso, Fla. 32580

[21] Appl. No.: 870,293

[22] Filed: Jan. 18, 1978

[51] Int. Cl.² .......................................... E05B 73/00
[52] U.S. Cl. ...................................... 70/58; 70/232; 70/DIG. 57
[58] Field of Search ................. 70/57, 58, 229, 230, 70/232, 258, DIG. 57, DIG. 58; 211/4; 248/203

[56] References Cited

U.S. PATENT DOCUMENTS

| | | | |
|---|---|---|---|
| 3,410,122 | 11/1968 | Moses | 70/58 |
| 3,563,070 | 2/1971 | Earl | 70/232 |
| 3,564,879 | 2/1971 | Bennett | 70/232 |

Primary Examiner—Robert L. Wolfe
Attorney, Agent, or Firm—George H. Baldwin; Arthur G. Yeager

[57] ABSTRACT

A locking arrangement for preventing the theft of CB radios or the like from a mounting bracket in a vehicle including a locking device preventing access to the heads of the bolts which attach the radio to the bracket. The arrangement includes a hollow tubular housing or sleeve member provided with openings whereby it is bolted in place by the bolts which mount the CB radio to the mounting bracket. A bar member is slidable into the housing member to cover the heads of the mounting bolts, and a lock is provided for locking the bar in place in the housing member.

11 Claims, 5 Drawing Figures

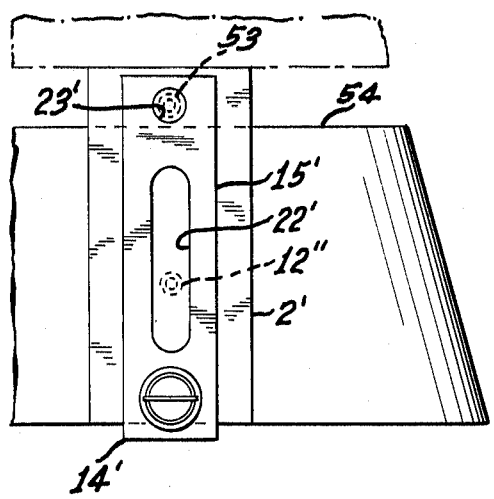
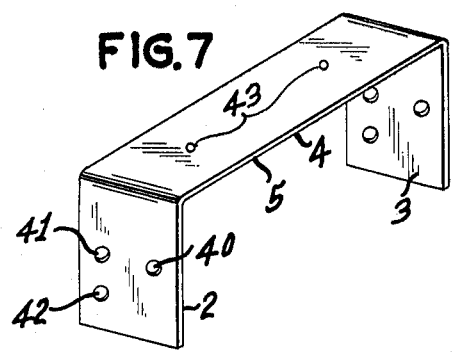
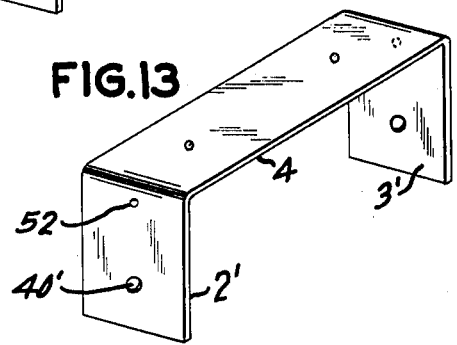
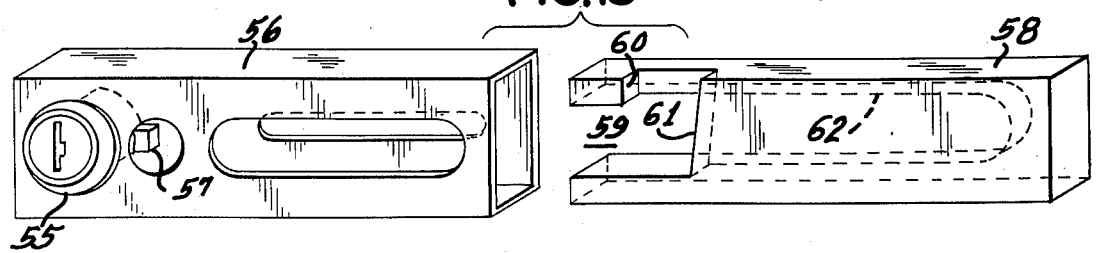
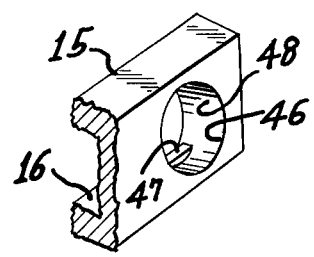
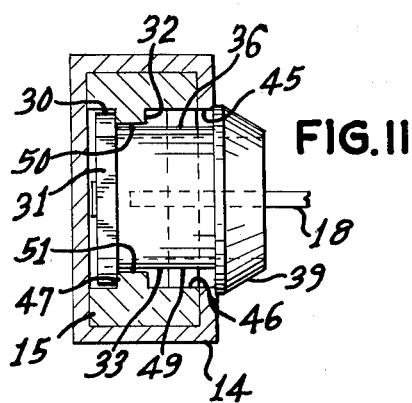
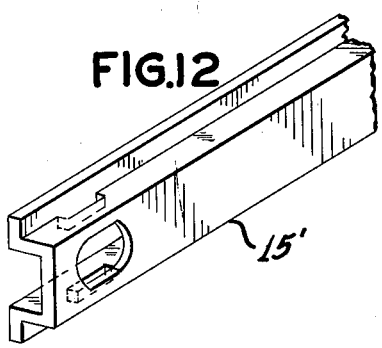

LOCKING ARRANGEMENT FOR RADIOS OR THE LIKE

BACKGROUND OF THE INVENTION

A current crime problem is the widespread theft of Citizen Band radios, tape decks, and the like from automobiles or other vehicles. Most CB radios and similar devices are mounted by being bolted to and between the arms of a U-shaped bracket, the base of the bracket being, in turn, screwed to the bottom lip of the dashboard, or in a similar location, on the vehicle. To steal the radio, it has been necessary only to remove the mounting bolts which mount the radio to the bracket arms and to disconnect or cut the antenna wire and power cable.

A general object of the invention is to make it difficult and time consuming for a thief to detach a CB radio, or similar apparatus, from a vehicle, and particularly difficult to detach the radio without causing such damage thereto as would result in its being unsalable. The invention is directed to locking devices which completely enclose the normally exposed heads of the fastening or securing bolts for the unit, preventing access thereto. The locking device comprises an outer tubular sleeve connected by the securing bolt or bolts to the bracket, an inner slidable bar with a groove therein which encloses the head or heads of the securing bolt or bolts, and a lock securing the inner bar member in place within said sleeve so as to prevent its removal therefrom.

SUMMARY OF THE INVENTION

The invention is directed to an anti-theft lock for vehicle CB radios and similar devices of the type in which the radio unit is mounted by its end walls within an inverted U-shaped mounting bracket by securing bolts which are normally exposed and readily removable. The U-shaped mounting bracket is attached to the bottom lip of the dashboard by sheet-metal screws or by bolts.

The lock includes an outer tubular housing or sleeve member which is attached to the mounting bracket by the bolts that secure the radio to the bracket. Inside the sleeve member is a slidable inner cover bar which is provided with a longitudinal groove. The bar is slipped into place to cover the bolt heads which are accommodated in the groove, and the bar is then locked in place to prevent access to the bolt heads.

The inner bar is retained against longitudinal displacement with respect to the sleeve member when in the locked position by a cylinder lock body which extends through a wall of said sleeve member and into an opening in said sleeve. The lock includes a keeper which, when in locked position, prevents relative motion between the lock body and the bar member. The lock body is disposed in an opening in the sleeve to prevent relative motion between the lock body and the sleeve, whereby removal of the bar member is prevented.

The mounting bracket is protected from removal from the dashboard by having cups which surround the mounting screw heads and prevent wrench access thereto when the radio is in place.

The whole device is aesthetically pleasing and simple to operate, and once the radio is mounted with the radio retaining bolts extending through a wall of the sleeve, the locking is accomplished by merely moving the inner bar within the housing to the locked position, by inserting the lock body in the apertures therefore according to the first embodiment and by turning and removing the key, or according to the modified embodiment, by so moving the bar and by turning and removing the key.

DESCRIPTION OF THE PRIOR ART

The prior art known to applicant is as follows: Moses - 3,410,122; Earl - 3,563,070; Leeper - 3,595,041; Vaughn et al - 3,287,943 and Palazzolo - 3,672,190.

BRIEF DESCRIPTION OF THE DRAWINGS

The novel features which are believed to be characteristics of this invention are set forth with particularity in the appended claims. The invention, itself, however, both as to its organization and method of operation, together with further objects and advantages thereof, may best be understood by reference to the following description taken in connection with the accompanying drawings in which:

FIG. 7 is a perspective view on a reduced scale of a typical mounting bracket for a CB radio;

FIG. 10 is a perspective view on an enlarged scale of a broken away portion of the inner bar member of FIGS. 8 and 9;

FIG. 11 is a sectional view on an enlarged scale taken along the line 11—11 of FIG. 4;

FIG. 12 is a perspective view of an inner bar formed of sheet metal for use in the preferred embodiment of my invention;

FIG. 13 is a view similar to FIG. 7 of another typical mounting bracket for a CB radio;

FIG. 14 is an elevational view similar to FIG. 4 showing a modified locking device accooding to the invention for use with a mounting bracket according to FIG. 13; and FIG. 15 is a perspective view of a bracket-radio locking device in accordance with a second modified embodiment of my invention.

DESCRIPTION

Figure 1:
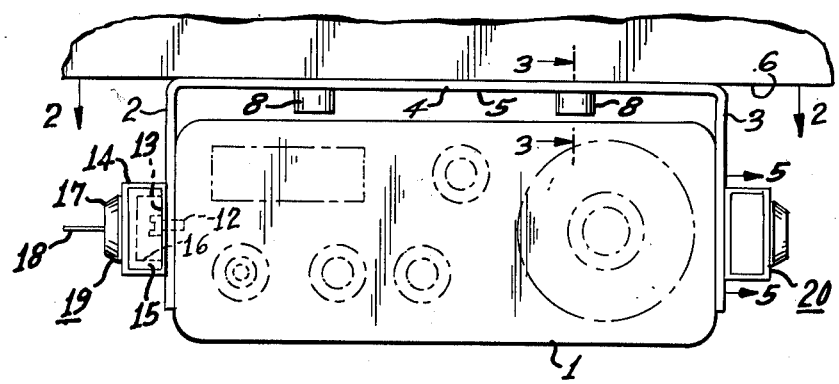
FIG. 1 is a front elevational view of a pair of locks, according to the preferred embodiment of my invention, in position to lock a CB radio, mounted between the arms of a supporting bracket, which bracket in turn, is mounted under a vehicle dashboard, shown in fragment, and further showing shielding cups protecting the heads of bolts which mount the bracket to the dashboard.
Figure 3:
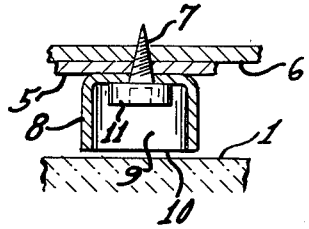
FIG. 3 is a cross-sectional detailed view, on an enlarged scale, taken along the line 3—3 of FIG. 1.
Figure 2:
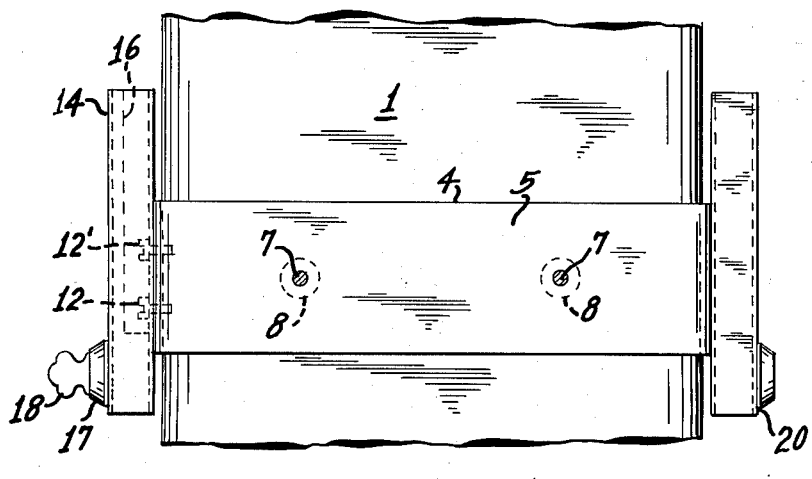
FIG. 2 is a sectional view taken along line 2—2 of FIG. 1.

Referring to FIGS. 1, 2 and 3 of the drawings, CB radio 1 is mounted to the depending arms 2 and 3 of a typical mounting bracket 4 of which the horizontal upper plate portion 5 is attached to the lip 6 of an automobile dashboard by means of sheet metal screws 7, or by suitable nuts and bolts, such as screws or bolts being preferably of Allen head type. Each of the mounting screws is protected against wrench access by a depending cup 8. As seen in FIG. 3, screw 7 is screwed through the bottom 9 of the cup, and the open top 10 of the cup is closely adjacent to the top of the radio, so that the head 11 of the screw may be contacted by a wrench only when the radio has been removed.

The radio is bolted by mounting bolts, such as bolts 12 and 12' shown in broken lines in FIGS. 1 and 2, to the arms 2 and 3 of the mounting bracket. The mounting bolts pass through openings provided in the inner or back wall 13 of a hollow sleeve member 14, through openings in the bracket arms, such as arm 2, and thence into a screw threaded socket or opening in the radio or the like 1. A rectilinear, and preferably rectangular, inner bar 15 fits slideably within the preferably rectangular sleeve 14, the bar being provided with a longitudinally extending groove or channel, as seen in broken lines at 16, to clear the heads of bolts 12 and 12'. A cylinder lock 17, which is operated by a key 18, retains the slideable inner bar member 15 in position within the sleeve 14, with the heads of the mounting bolts 12 disposed within the groove or channel 16. The lock assembly, which is generally indicated at 19, and which comprises the sleeve 14, inner bar 15 and cylinder lock 17, is in accord with this invention, and it will be seen that one such assembly is employed in connection with arm 2 at one respective end of the radio 1, and that an identical such assembly is employed as seen at 20 in connection with bracket arm 3 at the opposite end of the radio. The locking device 19 is symmetrical about a horizontal central plane and, in order that the key operated cylinder lock will be disposed toward the front of the radio in a position which is readily accessible to key 18, one side of the assembly will be up when the assembly is in the position 19 and the assembly will simply be inverted when it is to be used in the position 20.

Figure 4:
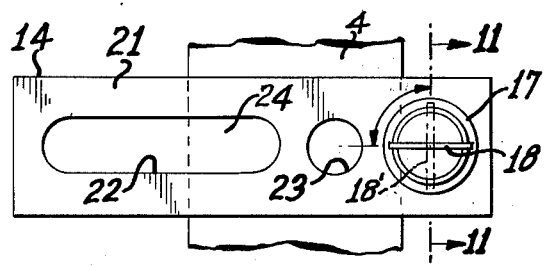
FIG. 4 is a front elevational view on a scale enlarged from that of FIGS. 1 and 2 of the radio retaining bolt locking device and a fragment of the mounting bracket shown in FIGS. 1 and 2.

FIG. 4 is a front elevation of the assembly as it would be viewed from the left of FIGS. 1 or 2. It will be seen that the front wall portion 21 of the sleeve member 14 is provided with two apertures 22 and 23 spaced longitudinally therealong and exposing portions of the front face 24 of the inner bar member 15, and that the cylinder lock body 17 is disposed alignedly beyond these apertures. The key 18 is shown in horizontal position in solid lines corresponding to locked condition of the cylinder lock, and, as indicated at 18' in broken lines, the key may be turned through 90° to unlock the cylinder lock. When the lock is unlocked, according to the preferred embodiment, it may be completely removed from the assembly to free the inner bar for longitudinal movement out of the sleeve 14.

Figure 5:
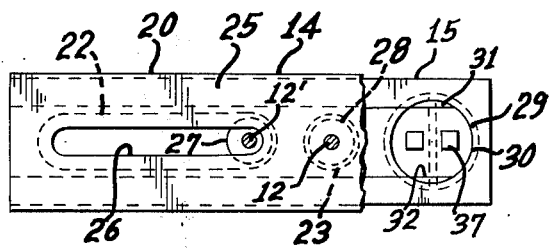
FIG. 5 is a rear elevational view partially cut away, on the scale of FIG. 4 taken along line 5—5 of FIG. 1.

In the back view of the lock assembly, FIG. 5, it will be seen that the back wall 25 of the sleeve member 14 is provided with an aperture 26 aligned opposite to aperture 22 of the front wall, the aperture 22 being represented in broken lines. The head 27 of mounting bolt 12' is disposed outwardly of and engaged against inner wall with the bolt shank extending through aperture 26. Bolt 12 is similarly arranged with its head inside the sleeve and engaged against wall 25 with its shank extending through aperture 23. The cylinder lock comprises a rotatable lock bolt or pawl member 29 which includes oppositely extending arcuate locking wing or pawl portions, such as pawl 30, and cut-off side portions, such as portion 31, the portion 31 being arranged, when the cylinder lock is in unlocked condition, to clear tabs or shoulders 32 formed integrally with the inner bar 15.

Figure 6:
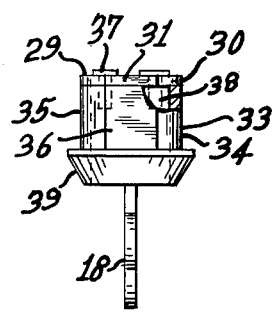
FIG. 6 is a plan view, partially broken away and on an enlarged scale, of a cylinder lock body and key in accordance with the preferred embodiment of my invention.

The cylinder lock as shown in FIG. 6 includes a body 33 of which the opposite side portions 34 and 35 are cylindrically arcuate and in which these cylindrical surface portions are joined by opposite flat surface portions, such as surface portion 36, an identical flat surface portion being provided symmetricaly opposite surface portion 36. The wing-like pawl portions, such as portion 30, of the rotatable lock bolt 29, and the flat side portions of the bolt, such as portion 31, may conform exactly in shape to, and, when the lock is in open position as shown in FIG. 6, may be aligned with, the cylindrical surface portions 34 and 35 and the flat surface portions 36 of the cylinder lock body. The pawl or bolt 29 is attached by studs, such as stud 37, to the inner key-rotatable cylinder 38 which rotates within body 33 upon operation of key 18. The cylinder lock body is further provided with a bezel 39 at its exposed end. The lock is shown in unlocked condition in FIG. 6.

A typical mounting bracket 4 is shown in FIG. 7, the bracket being provided with a pair of openings 40 and 41 in depending arm 2. The arm may be further provided with other openings, such as opening 42, whereby the radio may be mounted through openings 40 and 41 in a horizontal position, or, alternatively, in openings 40 and 42 to incline or tilt the front panel into a more convenient position. Arm 3 is provided with openings identical to those of arm 2, and openings 43 are provided in the laterally extending upper plate portion of the bracket to receive the sheet metal screws for attachment of the bracket to the dashboard lip.

Figure 8:
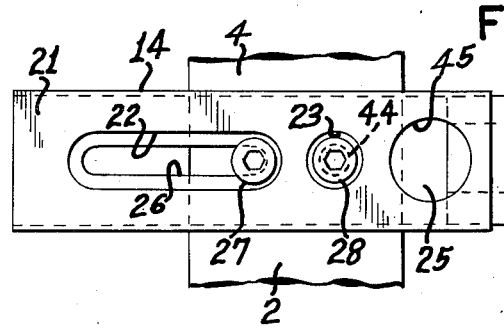
FIG. 8 is a front elevational view similar to FIG. 4 with the lock body removed and with the inner bar member partially removed from the outer housing.

Referring to FIG. 8, showing the sleeve 14 with the inner bar 15 longitudinally displaced from locking or closed position, it will be seen that bolt heads 27 and 28 are exposed through the apertures 22 and 23 in the front wall 21 of the sleeve member whereby the shanks of the bolt may pass through the apertures 26 and 44 in the back face 25 of the sleeve. The bolt heads, being engaged against the back face 25 of the sleeve, will retain the sleeve firmly against arm 2 of the bracket when these bolts have been inserted through the respective apertures, such as apertures 41 and 40, and screwed into the CB radio. It will be seen that elongated aperture 26 in the back wall 25 of the sleeve conforms generally to and is aligned with aperture 22 of the front wall but is smaller, whereby aperture 22 will pass the bolt head while aperture 26 will not.

Aperture 44 similarly conforms to but is smaller than front wall aperture 23. One of the sets of apertures, such as apertures 22 and 26, is elongated to permit accomodation of different spacing between openings 40, 41, or between openings 40, 42, of the bracket for the particular CB radio which is to be locked.

The outer or front plate portion 21 of the sleeve is provided with a round opening 45 through which the lock body 33 may be inserted. While opening 45 may be circular as shown, it may be shaped to conform to the proportions, including the rounded sides and upper and lower flat portions of the keeper 29 and lock body 33, if desired.

While the mounting bolts screwed securely into the radio and securely attaching sleeve 14 against the bracket arm, the inner bar 15 is slid in place until aperture 46 thereof aligns with aperture 45, whereupon the lock body may be positioned in the aligned apertures.

Figure 9:
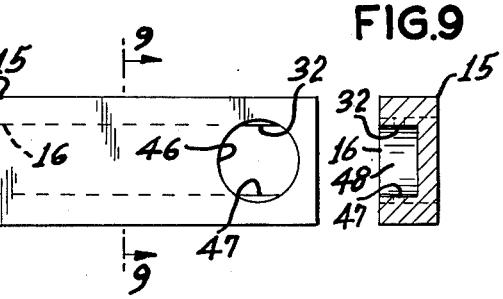
FIG. 9 is a sectional view of the inner bar member taken along line 9—9 of FIG. 8.

As seen in FIGS. 8 and 9, the bar member 15 is provided with a groove or trough 16 having a width equal to the distance between lips or lugs 32 and 47. The groove and the bar may be milled by a circular cutter so as to terminate in an arcuate end wall 48, and such end wall may comprise a part of the wall defining the opening 46 for the body of the cylinder lock.

The internal configuration with respect to the two identical pawl-engageable lips or lugs in the cylinder lock body opening 46 will be further understood with reference to FIG. 10, which shows lip or lug 47. It will be understood from FIGS. 10 and 11 that the flat surfaces 36 and 49 of the body 33 of the cylinder lock are, when the body is in position in opening 46, closely adjacent or in slideable engagement with the flat confronting faces 50 and 51 of the lugs or lips 32 and 47 and that the lock body is thus retained against rotation in the opening 46. The cylinder lock is shown in FIG. 11 in locked condition with the bar 15 held against sliding movement in that the pawls, such as pawl 30, are engaged against lugs 32 and 47 preventing displacement between the cylinder lock body and the inner bar, and, since the lock body is thus retained by the pawls and lugs in fixed position in the sleeve opening 45, relative movement between bar 15 and the sleeve is prevented.

The opening 46 may be readily formed by boring or milling, with a flat ended boring or milling tool, from the front or back of the bar, so as to leave lips or lugs 32 and 47.

FIG. 12 shows a bar 15' which may be fabricated by punching and braking a strip of sheet metal on a cornice brake or the like, or by punching or machining an extruded shape. The bar member so formed provides portions conforming to those of the bar 15 previously described, and it may lend itself to more economical manufacture in some instances.

While it is contemplated that the sleeve and inner bar members are most suitably formed of metal, it may be economically desirable to form these members of fiberglass reinforced or high impact plastic resin materials, for example.

Certain CB radios or the like may be provided with a single hole mounting bracket such as shown in FIG. 13, wherein the depending arms 2' and 3' are each provided with only one mounting hole 40'. In such cases, it is preferred that the locking mechanism be arranged vertically as seen in FIG. 14. To prevent the locking devices 14' from being bodily rotated about the axis of the mounting bolt 12", a small hole 52 is drilled in each of arms 2' and 3' spaced upwardly from the mounting bolt opening 40'. The sleeve member 14' is, in this instance, preferably provided with an elongated opening 22' adjacent the cylinder lock and a round opening 23' remote from the cylinder lock, whereas the reverse arrangement is employed for the horizontally disposed locking device for the two hole mount as previously described. The mounting bolt 12" extends through a slotted opening in the back wall which is aligned with opening 22', while a sheet metal screw 53 extends through a round opening in the back wall aligned with front wall opening 23', the screw being threaded into small hole 52 of the bracket arm 2'. Hole 52 is preferably disposed above the top 54 of the radio so that the tip of screw 53 will not damage the radio. The arrangement of FIG. 14 provides conveniently accessible positioning of the cylinder lock. The inner bar, of course, covers the heads of the sheet metal screw and of the mounting bolt.

The locking device of FIG. 14 is otherwise as described in connection with FIGS. 1-11.

While the second screw threaded element 53 is provided to prevent rotation of the locking device about the mounting bolt for a single mounting bolt bracket and radio, it will be apparent that the second mounting bolt 12' prevents rotation of the locking device about mounting bolt 12 in the arrangement of FIGS. 1-11.

A modified locking device is shown in FIG. 15, wherein cylinder lock 55 is non-rotatively and non-removably fixed to sleeve 56, the sleeve being identical to sleeve 14 of the preferred embodiment. The cylinder lock 55 is provided with a bolt or pawl 57 which, when the internal lock cylinder is rotated, swing from the horizontal unlocked position shown to an upwardly extending locked position. The inner bar member 58 is cut away at its forward end as seen at 59 to clear the body of lock 55 but so as to leave a lip or lug 60 for engagement by pawl 57 when the cylinder lock is in locked condition. The cut-away portion 59 further defines a shoulder 61 which engages the body of the cylinder lock when the bar member 58 is fully inserted into the sleeve, whereby the bar member is retained against movement in either direction when locked in position by pawl 57.

The bar member is provided with a groove 62 corresponding to groove 16 of the first embodiment to accommodate the mounting bolt heads.

Of course, the assembly as shown in FIG. 15 would be reversed when moved from one to the other end of the radio, and pawl 57 would then be swung downwardly to assume the locked position extending laterally of the longitudinal axis of the sleeve and bar.

While the terms "horizontal" and "vertical" are used herein, it will be understood that such terminology is intended to be non-restrictive but to contemplate generally horizontal or inclined, and generally vertical or upright, respectively.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a locking device for covering against access the head of a mounting bolt for mounting a CB radio or the like to a mounting bracket, an elongated sleeve having opposite front and back walls and an open end, an elongated bar slideable into said sleeve through said open end, said back wall being provided with a hole proportioned to pass the shank but not the head of such mounting bolt and said front wall being provided with a second hole aligned with said first hole proportioned to pass the head of such mounting bolt, said front wall and said bar comprising wall portions defining a continuous aperture extending through said front wall and into said bar when said bar is in a predetermined position in said sleeve, a lock having a portion disposed removably in said aperture through said front wall and into said bar, said lock comprising means movable with respect to said portion from a locked to an unlocked position cooperative, when in locked position, with said sleeve and bar to retain said portion so disposed in said aperture, said bar comprising a portion which is disposed, when said bar is in said predetermined position within said sleeve, in covering relation to said second hole.

2. The combination according to claim 1 wherein said portion of said lock comprises a body portion thereof and said movable means comprises a rotatable pawl, and wherein said wall portions are provided with a shoulder engaged by said pawl when said pawl is in locked position.

3. The combination according to claim 2 wherein said shoulder is integral with said bar.

4. The combination according to claim 1 wherein said back wall is provided with an additonal back wall hole and said front wall is provided with an additional front wall hole aligned therewith and of greater dimensions, and wherein said bar portion, when said bar is in said predetermined position within said sleeve, is in covering relation to said additional front wall hole.

5. A locking arrangement for covering the head of a mounting bolt for connecting a CB radio or the like to a mounting bracket in a vehicle comprising a hollow elongated tubular sleeve having an open end, an opposite end, a back face and an oppositely disposed front face, said back face being apertured to pass the shank of such mounting bolt therethrough for connecting the sleeve to such mounting bracket with the head of such bolt being disposed in said sleeve and its shank passing through said bracket and threaded into said radio or the like, means for anchoring said sleeve to said bracket against rotation about said mounting bolt, said front face being apertured to permit turning tool access to said head, said front face being provided with a lock aperture, an inner bar member having front and back faces and being longitudinally slidable within said sleeve, said bar member having a longitudinal groove in its back face dimensioned to clear said head and having a lock aperture opening through its front face which is aligned with said lock aperture in said sleeve when said bar member is in position to cover such head, and lock means disposable in said aligned lock apertures for retaining said bar in said position.

6. A locking arrangement in accord with claim 5 wherein the lock comprises a body which is disposable in said lock admission apertures and a pawl rotatable with respect to said body, and wherein said inner bar member comprises a lug selectively engageable by said pawl.

7. The locking arrangement according to claim 5 wherein said means for anchoring said sleeve to said bracket comprises an element having a head in said sleeve and a threaded shank passing through said back face and engaged in an opening in said bracket.

8. A locking arrangement in accord with claim 6 wherein said lock body is fixed to said sleeve.

9. A locking arrangement in accord with claim 6 wherein said lock body is insertable into and removable from said apertures when said pawl is in unlocked position, and wherein said lug is engaged by said pawl when said body is so disposed in said apertures and said pawl is in locked position.

10. A locking arrangement in accord with claim 9 wherein said body and apertures are generally cylindrical, said body has a discontinuous surface portion, and wherein said body is retained against rotation in said apertures by engagement of said discontinuous surface portion with said lug.

11. A locking device for covering the heads of mounting bolts connecting CB type apparatus to a mount comprising a hollow tubular sleeve having an open end and having connection apertures in a wall thereof allowing admission therethrough of the shanks of such mounting bolts and turning tool access apertures disposed in a wall of said sleeve opposite said connection apertures to provide access to the heads of said bolts, a lock body fixedly mounted on said opposite wall of said sleeve and extending into said sleeve, said lock body having a rotatable locking pawl disposed inwardly of said sleeve, a bar member slidable within said sleeve and having a groove therein for providing a raceway for said heads, said bar member being disposable in said sleeve from a position exposing said heads to a position covering said heads, said bar member having an open end and an opening extending from said end to the region of said lock body to provide a raceway for said body, and said bar member having a locking lug cooperating with said pawl to lock said bar in said head covering position when said pawl is in locked position.

* * * * *